US009521392B2

(12) United States Patent
Dwivedula et al.

(10) Patent No.: US 9,521,392 B2
(45) Date of Patent: Dec. 13, 2016

(54) METHOD AND SYSTEM FOR FRAME RATE CONVERSION OF 3D FRAMES

(75) Inventors: Priya Dwivedula, Bensalem, PA (US); Michael Erwin, Columbus, NJ (US); Eric Klings, Freehold, NJ (US); Paul Gehman, Doylestown, PA (US); Larry Pearlstein, Newtown, PA (US)

(73) Assignee: BROADCOM CORPORATION, Irvine, CA (US)

( * ) Notice: Subject to any disclaimer, the term of this patent is extended or adjusted under 35 U.S.C. 154(b) by 1165 days.

(21) Appl. No.: 13/009,946

(22) Filed: Jan. 20, 2011

(65) Prior Publication Data

US 2012/0154527 A1    Jun. 21, 2012

Related U.S. Application Data

(60) Provisional application No. 61/425,504, filed on Dec. 21, 2010.

(51) Int. Cl.
*H04N 13/02* (2006.01)
*H04N 13/00* (2006.01)

(52) U.S. Cl.
CPC ...... *H04N 13/0029* (2013.01); *H04N 13/0282* (2013.01)

(58) Field of Classification Search
USPC ........................................... 348/43
See application file for complete search history.

(56) References Cited

U.S. PATENT DOCUMENTS 6,055,012 A * 4/2000 Haskell et al. ............... 348/48

* cited by examiner

*Primary Examiner* — Mikhail Itskovich
(74) *Attorney, Agent, or Firm* — Foley & Lardner LLP; Christopher J. McKenna; Daniel E. Rose

(57) ABSTRACT

A 3-dimensional (3D) video rendering device may convert a first left view video of a decompressed 3D video having a first frame rate to generate a second left view video having a second frame rate, and convert a first right view video having the first frame rate to generate a second right view video having the second frame rate. The second left view video having a particular pixel resolution may be converted by the 3D video rendering device to generate a third left view video having full pixel resolution of the decompressed 3D video. The second right view video having the particular pixel resolution may be converted to generate a third right view video having the full pixel resolution. The 3D video rendering device may generate a sequence of video frames for 3D video display based on the third left view video and the third right view video.

20 Claims, 6 Drawing Sheets

METHOD AND SYSTEM FOR FRAME RATE CONVERSION OF 3D FRAMES

CROSS-REFERENCE TO RELATED APPLICATIONS/INCORPORATION BY REFERENCE

This patent application makes reference to, claims priority to, and claims benefit from U.S. Provisional Application Ser. No. 61/425,504, which was filed on Dec. 21, 2010.

The above stated application is hereby incorporated herein by reference in its entirety.

FIELD OF THE INVENTION

Certain embodiments of the invention relate to video processing. More specifically, certain embodiments of the invention relate to a method and system for frame rate conversion of 3D frames.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video. A 3D video frame may be produced by combining left view video components and right view video components.

Various video encoding standards, for example, MPEG-1, MPEG-2, MPEG-4, MPEG-C part 3, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC.

Digital TV (DTV) may support both high-definition television (HDTV) and standard-definition television (SDTV) video formats while traditional analog television may support only SDTV video formats. Video formats are generally characterized based on a combination of their size, aspect ratio (width to height ratio) and interlacing. Some examples are 720p and 1080i formats for HDTV and NTSC, SECAM and PAL formats for SDTV. Video signals with different video formats may have different frame rates. For example, PAL or SECAM format shows 25 frames per second (fps) while NTSC format shows about 30 frames per second (fps). Most feature films are projected at a rate of 24 frames per second (fps). Display systems or devices such as HDTVs may be capable of displaying video at a rate of 60, 100, 120, 200 or even 240 Hz. Some form of frame rate conversion (FRC) may be employed to convert, for example, from low frame rates to high frames rates for various display systems or devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for frame rate conversion of 3D frames, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
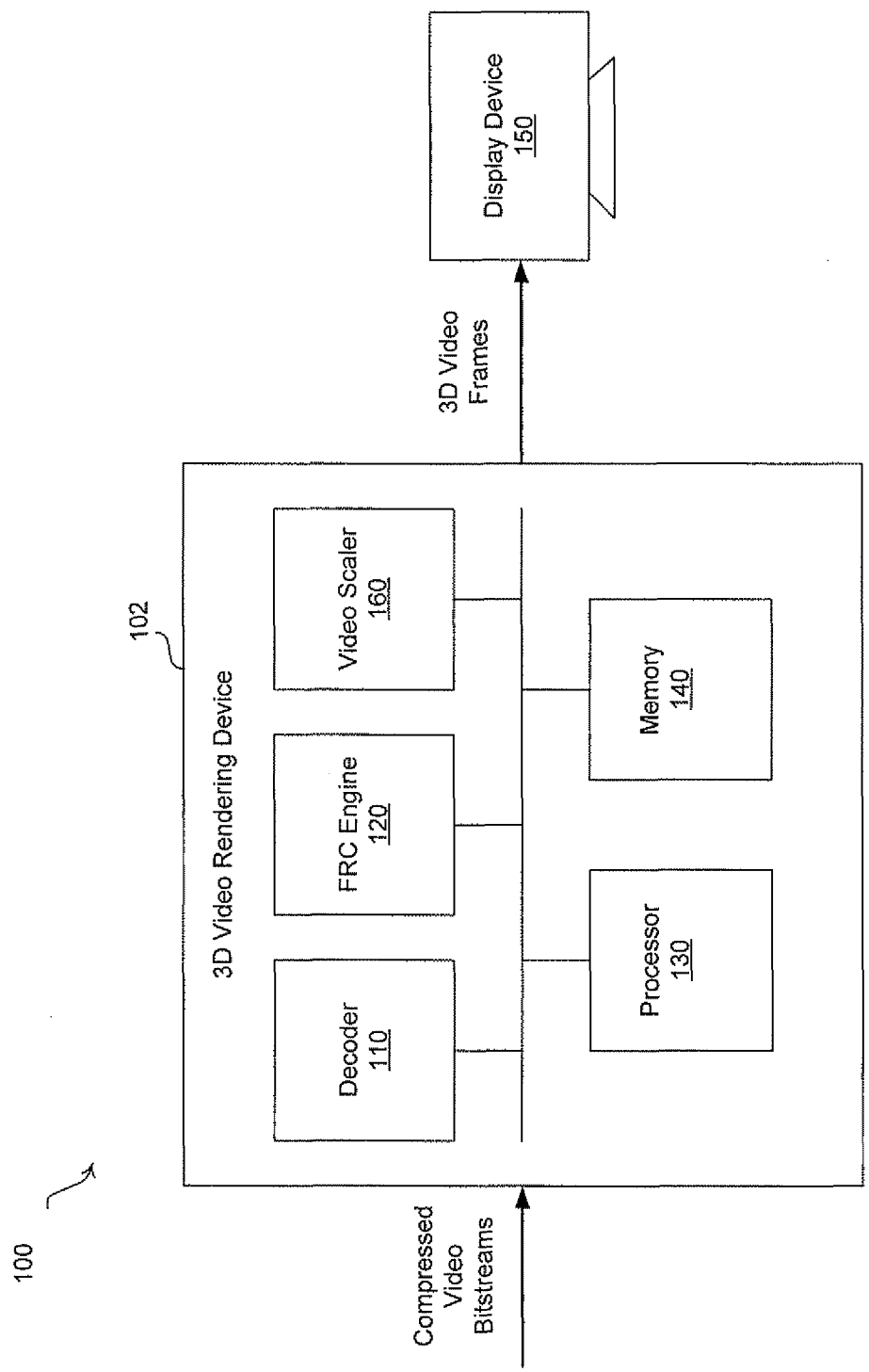
FIG. 1 is a block diagram illustrating an exemplary video processing system that is operable to provide frame rate conversion of 3D frames, in accordance with an embodiment of the invention.

Certain embodiments of the invention can be found in a method and system for frame rate conversion of 3D frames. In various embodiments of the invention, a 3-dimensional (3D) video rendering device may be operable to utilize frame rate conversion (FRC) to convert a first left view video of a decompressed 3D video having a first frame rate to generate a second left view video having a second frame rate. The 3D video rendering device may be operable to convert a first right view video of the decompressed 3D video having the first frame rate to generate a second right view video having the second frame rate, using frame rate conversion (FRC). The second left view video having the second frame rate, which may comprise a particular pixel resolution, may be converted by the 3D video rendering device to generate a third left view video having the second frame rate. The generated third left view video having the second frame rate may comprise full pixel resolution of the decompressed 3D video. The second right view video having the second frame rate, which may comprise the particular pixel resolution, may be converted by the 3D video rendering device to generate a third right view video having the second frame rate. The generated third right view video having the second frame rate may comprise the full pixel resolution. The 3D video rendering device may be operable to generate a sequence of video frames for 3D video display. The sequence of video frames may comprise frames corresponding to the third left view video and frames corresponding to the third right view video, and the frames corresponding to the third left view video may alternate with the frames corresponding to the third right view video. In this regard, the frame rate conversion (FRC) may comprise, for example, frame interpolation and/or frame repetition.

In an exemplary embodiment of the invention, the first left view video and the first right view video of the decompressed 3D video may be packed in a side-by side (half) format, where the first left view video and the first right view video may each comprise half pixel resolution of the decompressed 3D video. In such instances, the 3D video rendering device may scale the second left view video having the second frame rate, which may comprise the half pixel resolution, to generate the third left view video having the second frame rate, which may comprise the full pixel resolution. The 3D video rendering device may scale the second right view video having the second frame rate, which may comprise the half pixel resolution, to generate the third right view video having the second frame rate, which may comprise the full pixel resolution.

In an exemplary embodiment of the invention, the decompressed 3D video may comprise the first left view video and the first right view video which are packed in a top-and-bottom (half) format, and the first left view video and the first right view video may each comprise half pixel resolution of the decompressed 3D video. In such instances, the second left view video having the second frame rate, which may comprise the half pixel resolution, may be scaled by the 3D video rendering device to generate the third left view video having the second frame rate, which may comprise the full pixel resolution. The second right view video having the second frame rate, which may comprise the half pixel resolution, may be scaled by the 3D video rendering device to generate the third right view video having the second frame rate, which may comprise the full pixel resolution.

In an exemplary embodiment of the invention, the first left view video and the first right view video of the decompressed 3D video may be packed in a frame packing format. The first left view video and the first right view video may each comprise the full pixel resolution of the decompressed 3D video. In such instances, the second left view video and the second right view video may each comprise the full pixel resolution.

In an exemplary embodiment of the invention, the decompressed 3D video may comprise the first left view video and the first right view video in a stereoscopic format. The first left view video and the first right view video may each comprise the full pixel resolution of the decompressed 3D video. In such instances, the second left view video and the second right view video may each comprise the full pixel resolution.

FIG. 1 is a block diagram illustrating an exemplary video processing system that is operable to provide frame rate conversion of 3D frames, in accordance with an embodiment of the invention. Referring to FIG. 1, there is shown a video processing system 100. The video processing system 100 may comprise a 3D video rendering device 102 and a display device 150. The 3D video rendering device 102 may comprise a decoder 110, a FRC Engine 120, a video scaler 160, a processor 130 and a memory 140.

The 3D video rendering device 102 may comprise suitable logic, circuitry, interfaces and/or code that may be operable to receive compressed video bitstreams, decompress received video bitstreams, perform frame rate conversion (FRC) and/or generate video frames for 3D video display. The 3D video rendering device 102 may comprise, for example, a set-top box (STB) and/or a digital TV (DTV). The compressed video bitstreams may comprise, for example, AVC bitstreams, MVC bitstreams and/or SVC bitstreams.

The decoder 110 may comprise suitable logic, circuitry, interfaces and/or code that may be operable to decompress compressed video bitstreams received to generate decoded or decompressed 3D videos. The decoder 110 may be operable to perform various video decoding/decompression operations such as, for example, entropy decoding, inverse quantization, inverse transform, and motion compensated prediction. The decoder 110 may be operable to provide decompressed 3D videos to the FRC engine 120 for further 3D video processing.

The FRC engine 120 may comprise suitable logic, circuitry, interfaces and/or code that may be operable to convert video signals from one frame rate to another. For example, the FRC engine 120 may up-convert frame rate to provide higher quality picture results. In this regard, for example, the FRC engine 120 may be used to de-judder film content which is original shot at 24 Hz and/or reduce motion blur in video content. The FRC engine 120 may also be used to up-convert video content at a rate of 50 Hz or 60 Hz, for example, to a rate of 100 Hz, 120 Hz, 200 Hz or even 240 Hz for various display devices such as the display device 150. Various frame rate conversion (FRC) algorithms such as frame interpolation and/or frame repetition may be utilized by the FRC engine 120 to construct interpolated video frames. The frame interpolation may be used to generate interpolated video frames by predicting the pixels at each block of the video frame using motion vector estimation. The frame repetition or fallback may be used in instances when the frame interpolation may produce an interpolated frame with many visual artifacts, for example. In this regard, any common measure such as displayed frame difference (DFD) may be used to determine when to fallback, for example.

In an exemplary embodiment of the invention, the RFC engine 120 may be operable to convert a left view video of a decompressed 3D video at a particular frame rate to generate a new left view video at a new frame rate, and convert a right view video of the decompressed 3D video at the particular frame rate to generate a new right view video at the new frame rate.

The video scaler 160 may comprise suitable logic, circuitry, interfaces and/or code that may be operable to convert video signals from one size of pixel resolution to another. For example, the video scaler 160 may upscale or upconvert video signals from a low resolution to one of higher resolution. The video scaler 160 may receive a frame-rate converted left view video and a frame-rate converted right view video of a decompressed 3D video. In an exemplary embodiment of the invention, the video scaler 160 may convert the frame-rate converted left view video comprising a particular pixel resolution, such as half pixel resolution of the decompressed 3D video, to generate a new left view video comprising full pixel resolution of the decompressed 3D video. The video scaler 160 may convert the frame-rate converted right view video comprising the particular pixel resolution, such as the half pixel resolution of the decompressed 3D video, to generate a new right view video comprising the full pixel resolution of the decompressed 3D video.

The processor 130 may comprise suitable logic, circuitry, interfaces and/or code that may be operable to process compressed video bitstreams. The processor 130 may communicate with various components of the 3D video rendering device 120, such as the decoder 110, the FRC engine 1.20 and the video scaler 160, to perform various functions of the 3D video rendering device 102. The processor 130 may comprise any type of processor or processing circuit such as a video processor. In an exemplary embodiment of the invention, the processor 130 may be operable to generate a sequence of video frames and communicate the generated video frames to the display device 150 for 3D video display.

The memory 140 may comprise suitable logic, circuitry, interfaces and/or code that may be operable to store information such as executable instructions and data that may be utilized by the processor 130, the FRC engine 120, the decoder 110 and/or the video scaler 160 to perform various functions of the 3D video rendering device 102. The memory 140 may comprise RAM, ROM, low latency non-volatile memory such as flash memory and/or other suitable electronic data storage.

The display device 150 may comprise suitable logic, circuitry, interfaces and/or code that may be operable to display or present 3D video content and/or 2D video content to users or viewers. The display device 150 may be operable to use various interfaces such as a high definition multimedia interface (HDMI), Ethernet, and/or a Display port. The display device 150 may operate at a rate of 100 Hz, 120 Hz, 200 Hz or 240 Hz, for example. In some instances, the display device 150 may be integrated in the 3D video rendering device 102, for example.

In operation, the decoder 110 may decompress or decode compressed video bitstreams received by the 3D video rendering device 102 to generate a decompressed 3D video. The FRC engine 120 may convert a first left view video of the decompressed 3D video having a first frame rate to generate a second left view video having a second frame rate, and convert a first right view video of the decompressed 3D video having the first frame rate to generate a second right view video having the second frame rate. In this regard, frame rate conversion (FRC) algorithms used by the FRC engine 120 may comprise, for example, frame interpolation and/or frame repetition. The frame interpolation may be used to generate interpolated video frames by predicting the pixels at each block of the video frame using motion vector estimation. The frame repetition or fallback may be used in instances when the frame interpolation may produce an interpolated frame with many visual artifacts, for example. In this regard, for example, a displayed frame difference (DFD) may be used to determine when to fallback. The second left view video having the second frame rate, which may comprise a particular pixel resolution, may be converted or scaled by the video scaler 160 to generate a third left view video having the second frame rate, which may comprise full pixel resolution of the decompressed 3D video. The second right view video having the second frame rate, which may comprise the particular pixel resolution, may be converted or scaled by the video scaler 160 to generate a third right view video having the second frame rate, which may comprise the full pixel resolution. The processor 130 of the 3D video rendering device 102 may generate a sequence of video frames, where the sequence of video frames may comprise frames corresponding to the third left view video and frames corresponding to the third right view video, and the frames corresponding to the third left view video may alternate with the frames corresponding to the third right view video. Accordingly, a 3D video based on the sequence of alternate left view frame and right view frame may be displayed by the display device 150.

In an exemplary embodiment of the invention, the first left view video and the first right view video of the decompressed 3D video may be packed in a side-by side (half) format, where the first left view video and the first right view video may each comprise half pixel resolution of the decompressed 3D video. In such instances, the video scaler 160 may scale the second left view video having the second frame rate, which may comprise the half pixel resolution, to generate the third left view video having the second frame rate, which may comprise the full pixel resolution. The video scaler 160 may scale the second right view video having the second frame rate, which may comprise the half pixel resolution, to generate the third right view video having the second frame rate, which may comprise the full pixel resolution. An exemplary side-by-side (half) format is described below with respect to FIG. 2.

In an exemplary embodiment of the invention, the decompressed 3D video may comprise the first left view video and the first right view video which are packed in a top-and-bottom (half) format, and the first left view video and the first right view video may each comprise half pixel resolution of the decompressed 3D video. In such instances, the second left view video having the second frame rate, which may comprise the half pixel resolution, may be scaled by the video scaler 160 to generate the third left view video having the second frame rate, which may comprise the full pixel resolution. The second right view video having the second frame rate, which may comprise the half pixel resolution, may be scaled by the video scaler 160 to generate the third right view video having the second frame rate, which may comprise the full pixel resolution. An exemplary top-and-bottom (half) format is described below with respect to FIG. 3.

In an exemplary embodiment of the invention, the first left view video and the first right view video of the decompressed 3D video may be packed in a frame packing format, where the first left view video and the first right view video may each comprise the full pixel resolution of the decompressed 3D video. In such instances, the second left view video and the second right view video may each comprise the full pixel resolution, and the scaling performed by the video scaler 160 may be skipped during the process of generating the sequence of full-resolution video frames for 3D video display. An exemplary frame packing format is described below with respect to FIG. 4.

In an exemplary embodiment of the invention, the decompressed 3D video may comprise the first left view video and the first right view video in a stereoscopic format, and the first left view video and the first right view video may each comprise the full pixel resolution of the decompressed 3D video. In such instances, the second left view video and the second right view video may each comprise the full pixel resolution, and the scaling performed by the video scaler 160 may be skipped during the process of generating the sequence of full-resolution video frames for 3D video display. An exemplary stereoscopic format is described below with respect to FIG. 5.

Figure 2:
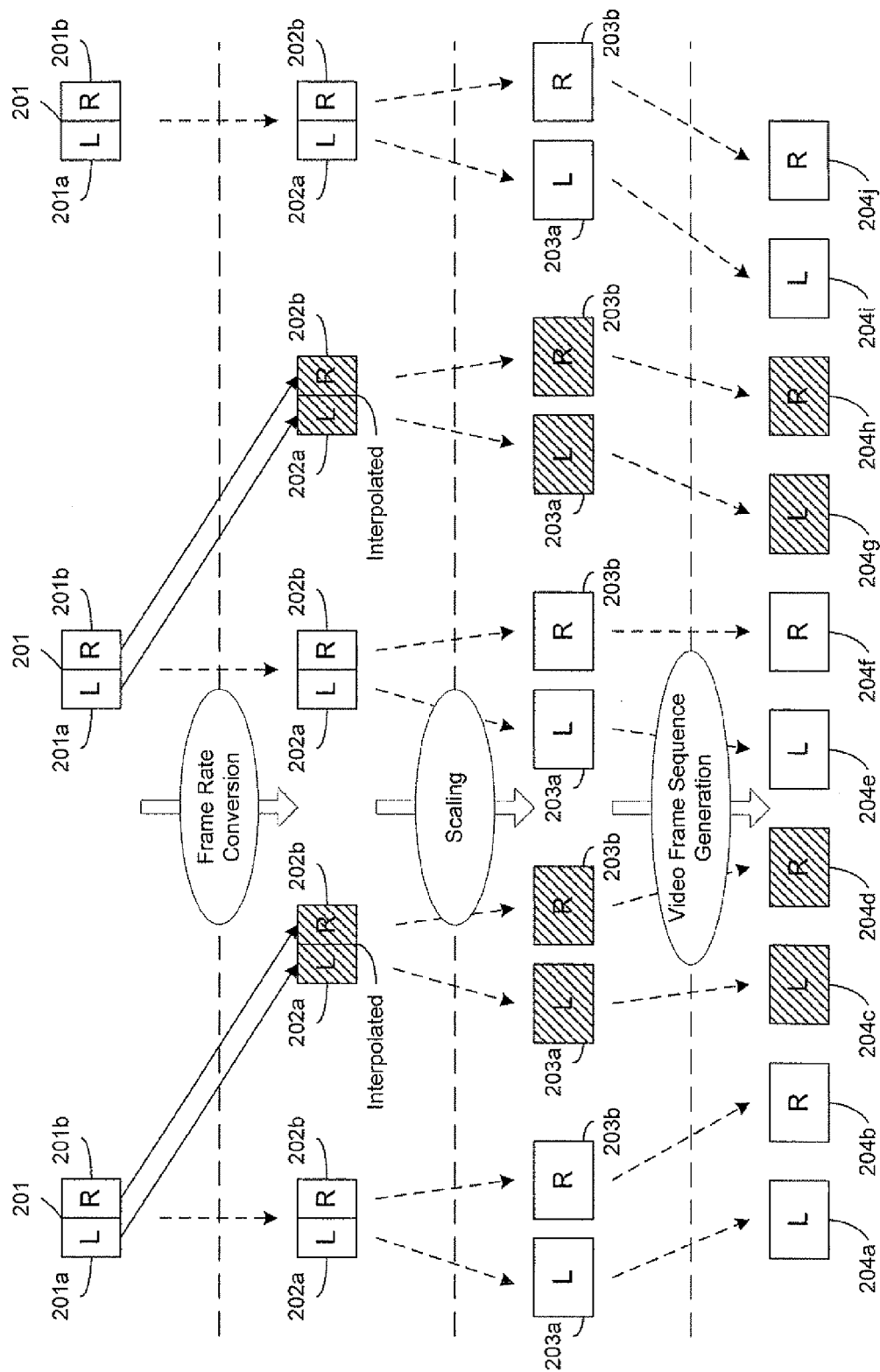
FIG. 2 is a block diagram illustrating an exemplary decompressed 3D video in a side-by-side (half) format, in accordance with an embodiment of the invention.

FIG. 2 is a block diagram illustrating an exemplary decompressed 3D video in a side-by-side (half) format, in accordance with an embodiment of the invention. Referring to FIG. 2, there is shown a decompressed 3D video 201 in a side-by-side (half) format. The decompressed 3D video 201 may comprise a left view video 201a and a right view video 201b. The left view video 201a and the right view video 201b are packed side-by-side in a single video frame. In this regard, for example, the decompressed 3D video 201 may comprise a resolution of 1920×1080 pixels, and the left view video 201a and the right view video 201b may each comprise half resolution of 960×1080 pixels.

In exemplary operation, the FRC engine 120 in the 3D video rendering device 102 may convert the left view video 201a of the decompressed 3D video 201 having a first frame rate to generate a second left view video such as the left view video 202a having a second frame rate, and convert the right view video 201b of the decompressed 3D video 201 having the first frame rate to generate a second right view video such as the right view video 202b having the second frame rate. In this regard, for example, the first frame rate may comprise a rate of 50 frames per second (fps) and the second frame rate may comprise, for example, a rate of 100 frames per second (fps). Although the left view video 201a and the right view video 201b may be packed in a single frame, the frame rate conversion may be performed for the left view video 201a and the right view video 201b independently without interfering with each other.

The left view video 202a may be scaled by the video scaler 160 in the 3D video rendering device 102 to generate a third left view video such as the left view video 203a, which may comprise the full resolution of 1920×1080 pixels. The right view video 202b may be scaled by the video scaler 160 to generate a third right view video such as the right view video 203b, which may comprise the full resolution of 1920×1080 pixels. The processor 130 of the 3D video rendering device 102 may then generate a sequence of video frames, where the sequence of video frames may comprise frames corresponding to the left view video 203a and frames corresponding to the right view video 203b. The frames corresponding to the left view video 203a may alternate with the frames corresponding to the right view video 203b, as illustrated by video frames 204a-204j. Accordingly, a 3D video based on the sequence of video frames 204a-204j may be displayed by the display device 150.

Figure 3:
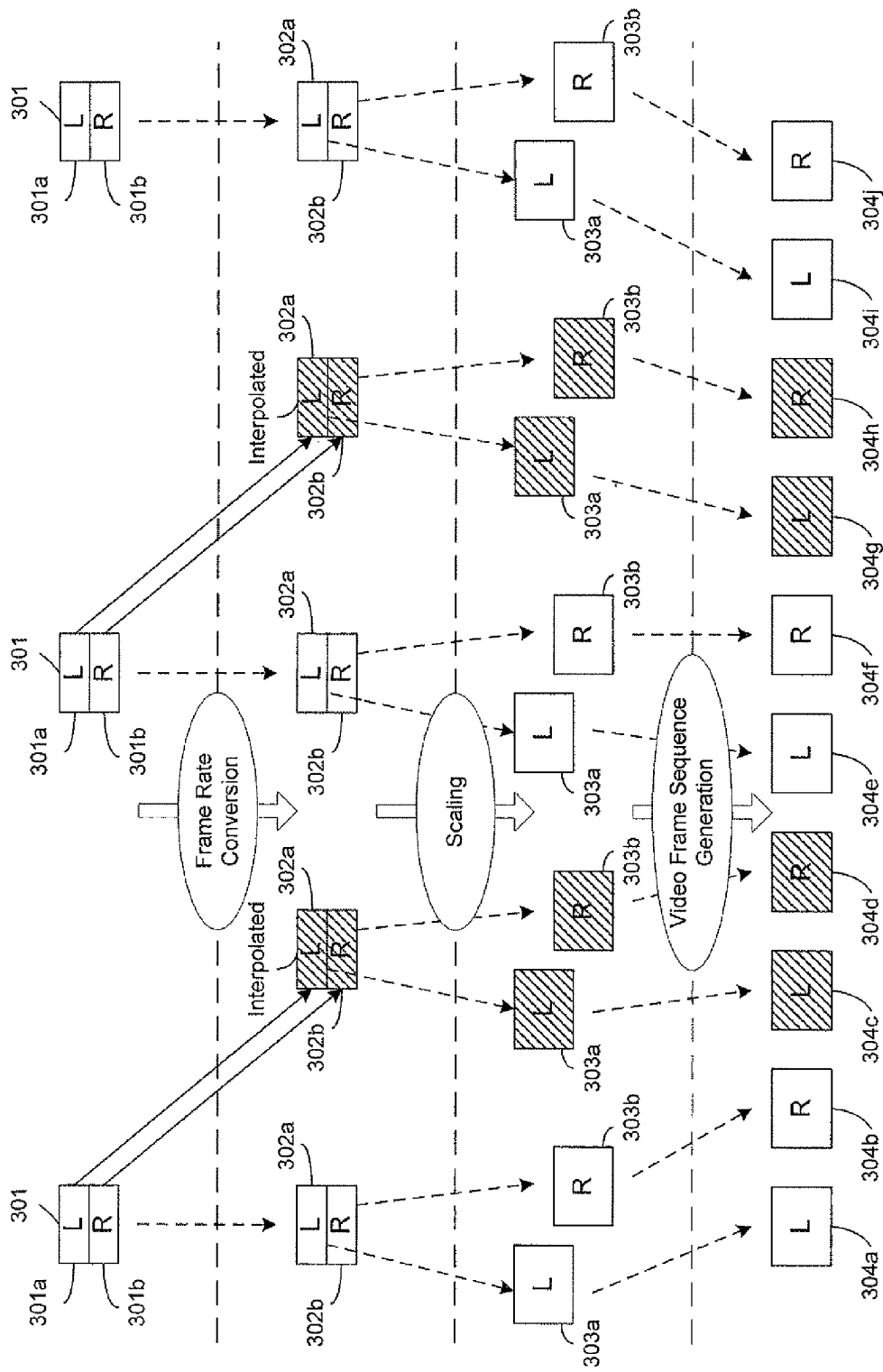
FIG. 3 is a block diagram illustrating an exemplary decompressed 3D video in a top-and-bottom (half) format, in accordance with an embodiment of the invention.

FIG. 3 is a block diagram illustrating an exemplary decompressed 3D video in a top-and-bottom (half) format, in accordance with an embodiment of the invention. Referring to FIG. 3, there is shown a decompressed 3D video 301 in a top-and-bottom (half) format. The decompressed 3D video 301 may comprise a left view video 301a and a right view video 301b. The left view video 301a and the right view video 301b are packed top-and-bottom in a single video frame. In this regard, for example, the decompressed 3D video 301 may comprise a resolution of 1280×720 pixels, and the left view video 301a and the right view video 301b may each comprise half resolution of 1280×360 pixels.

In exemplary operation, the FRC engine 120 in the 3D video rendering device 102 may convert the left view video 301a of the decompressed 3D video 301 having a first frame rate to generate a second left view video such as the left view video 302a having a second frame rate, and convert the right view video 301b of the decompressed 3D video 301 having the first frame rate to generate a second right view video such as the right view video 302b having the second frame rate. In this regard, for example, the first frame rate may comprise a rate of 60 frames per second (fps) and the second frame rate may comprise, for example, a rate of 120 frames per second (fps). Although the left view video 301a and the right view video 301b are packed in a single frame, the frame rate conversion may be performed for the left view video 301a and the right view video 301b independently without interfering with each other.

The left view video 302a may be scaled by the video scaler 160 in the 3D video rendering device 102 to generate a third left view video such as the left view video 303a, which may comprise the full resolution of 1280×720 pixels. The right view video 302b may be scaled by the video scaler 160 to generate a third right view video such as the right view video 303b, which may comprise the full resolution of 1280×720 pixels. The processor 130 of the 3D video rendering device 102 may then generate a sequence of video frames, where the sequence of video frames may comprise frames corresponding to the left view video 303a and frames corresponding to the right view video 303b. The frames corresponding to the left view video 303a may alternate with the frames corresponding to the right view video 303b, as illustrated by video frames 304a-304j. Accordingly, a 3D video based on the sequence of video frames 304a-304j may be displayed by the display device 150.

Figure 4:
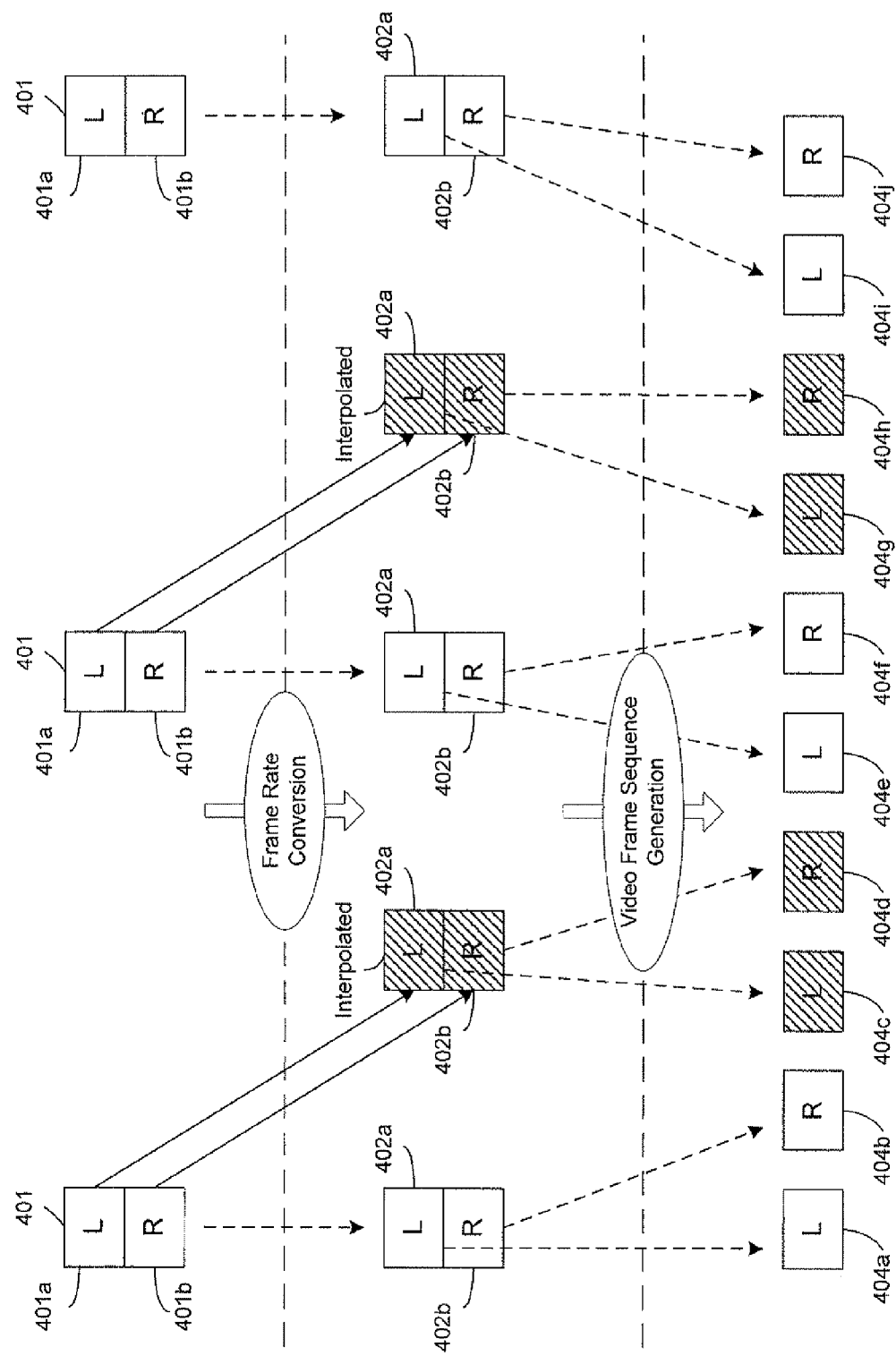
FIG. 4 is a block diagram illustrating an exemplary decompressed 3D video in a frame packing format, in accordance with an embodiment of the invention.

FIG. 4 is a block diagram illustrating an exemplary decompressed 3D video in a frame packing format, in accordance with an embodiment of the invention. Referring to FIG. 4, there is shown a decompressed 3D video 401 in a frame packing format. The decompressed 3D video 401 may comprise a left view video 401a and a right view video 401b. The left view video 401a and the right view video 401b may each comprise full pixel resolution. The left view video 401a and the right view video 401b are packed top-and-bottom in a single video frame. In this regard, for example, the left view video 401a and the right view video 401b may each comprise the full resolution of 1280×720 pixels, and the packed single frame may comprise a resolution of 1280×1440 pixels.

In exemplary operation, the FRC engine 120 in the 3D video rendering device 102 may convert the left view video 401a of the decompressed 3D video 401 having a first frame rate to generate a second left view video such as the left view video 402a having a second frame rate. The FRC engine 120 may also convert the right view video 401b of the decompressed 3D video 401 having the first frame rate to generate a second right view video such as the right view video 402b having the second frame rate. In this regard, for example, the first frame rate may comprise a rate of 50 frames per second (fps) and the second frame rate may comprise, for example, a rate of 100 frames per second (fps). Although the left view video 401a and the right view video 401b are packed in a single frame, the frame rate conversion may be performed for the left view video 401a and the right view video 401b independently without interfering with each other.

Since the left view video 402a and the right view video 402b may each comprise the full resolution of 1280×720 pixels, video frames corresponding to the left view video 402a or the right view video 402b may be generated without scaling. In this regard, the processor 130 of the 3D video rendering device 102 may then generate a sequence of video frames, where the sequence of video frames may comprise frames corresponding to the left view video 402a and frames corresponding to the right view video 402b. The frames corresponding to the left view video 402a may alternate with the frames corresponding to the right view video 402b, as illustrated by video frames 404a-404j. The sequence of video frames 404a-404j may be communicated by the 3D video rendering device 102 to the display device 150 for 3D video display or presentation.

Figure 5:
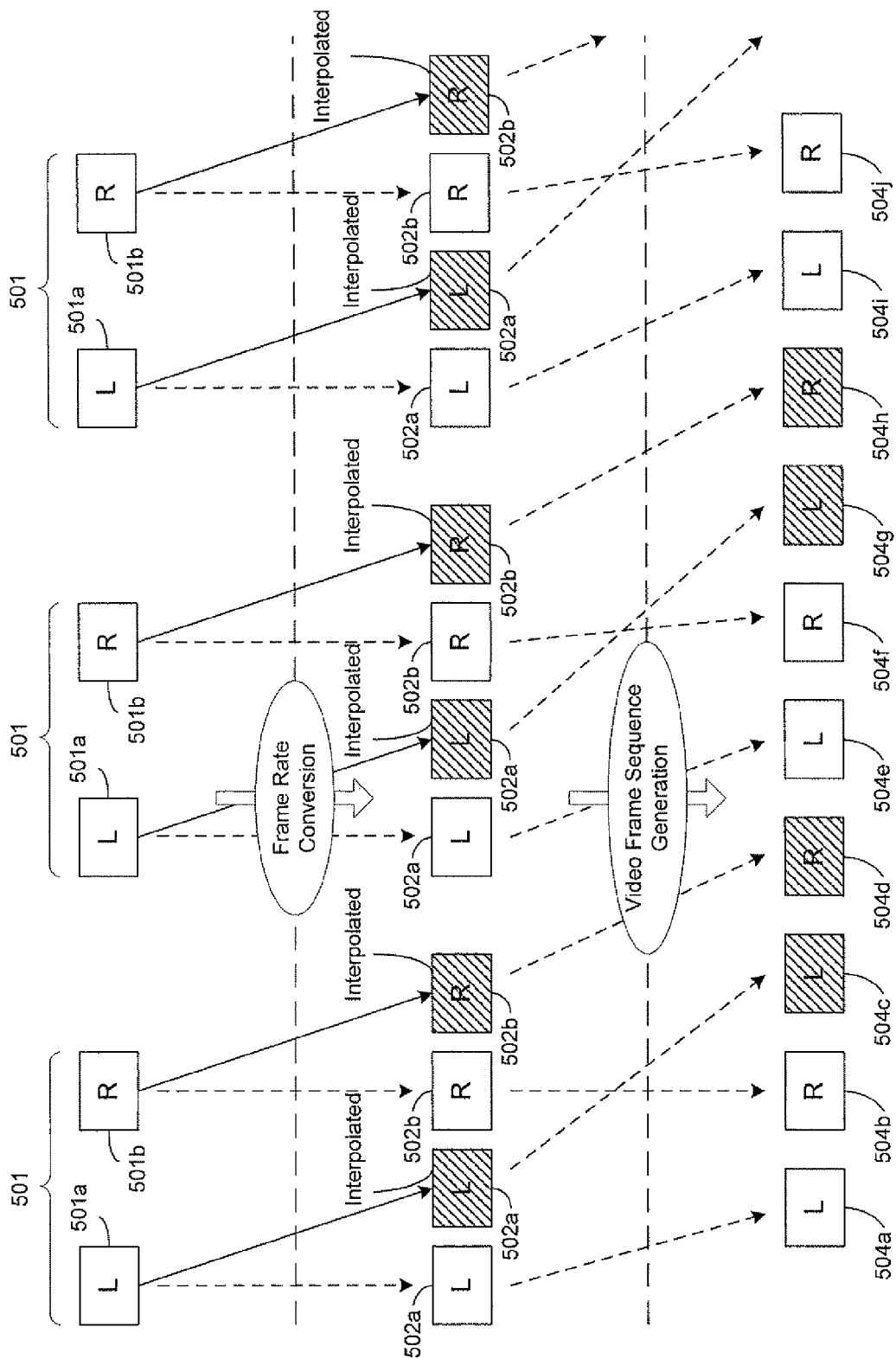
FIG. 5 is a block diagram illustrating an exemplary decompressed 3D video in a stereoscopic format, in accordance with an embodiment of the invention.

FIG. 5 is a block diagram illustrating an exemplary decompressed 3D video in a stereoscopic format, in accordance with an embodiment of the invention. Referring to FIG. 5, there is shown a decompressed 3D video 501 in a stereoscopic format. The decompressed 3D video 501 may comprise a left view video 501a and a right view video 501b. The left view video 501a and the right view video 501b may each comprise full pixel resolution. In this regard, for example, the left view video 501a and the right view video 501b may each comprise the full resolution of 1280×720 pixels.

In exemplary operation, the FRC engine 120 in the 3D video rendering device 102 may convert the left view video 501a of the decompressed 3D video 501 having a first frame rate to generate a second left view video such as the left view video 502a having a second frame rate, and convert the right view video 501b of the decompressed 3D video 501 having the first frame rate to generate a second right view video such as the right view video 502b having the second frame rate. In this regard, for example, the first frame rate may comprise a rate of 60 frames per second (fps) and the second frame rate may comprise, for example, a rate of 120 frames per second (fps). Since the left view video 501a and the right view video 501b are not packed in a single frame, the frame rate conversion may be performed for the left view video 501a and the right view video 501b separately and independently without interfering with each other.

Since video frames corresponding to the left view video 502a or the right view video 502b may each comprise the full resolution of 1280×720 pixels, the processor 130 of the 3D video rendering device 102 may generate, without scaling, a sequence of video frames which may comprise frames corresponding to the left view video 502a and frames corresponding to the right view video 502b. The frames corresponding to the left view video 502a may alternate with the frames corresponding to the right view video 502b in the sequence, as illustrated by video frames 504a-504j. The sequence of video frames 504a-504j may then be communicated by the 3D video rendering device 102 to the display device 150 for 3D video display or presentation.

Figure 6:
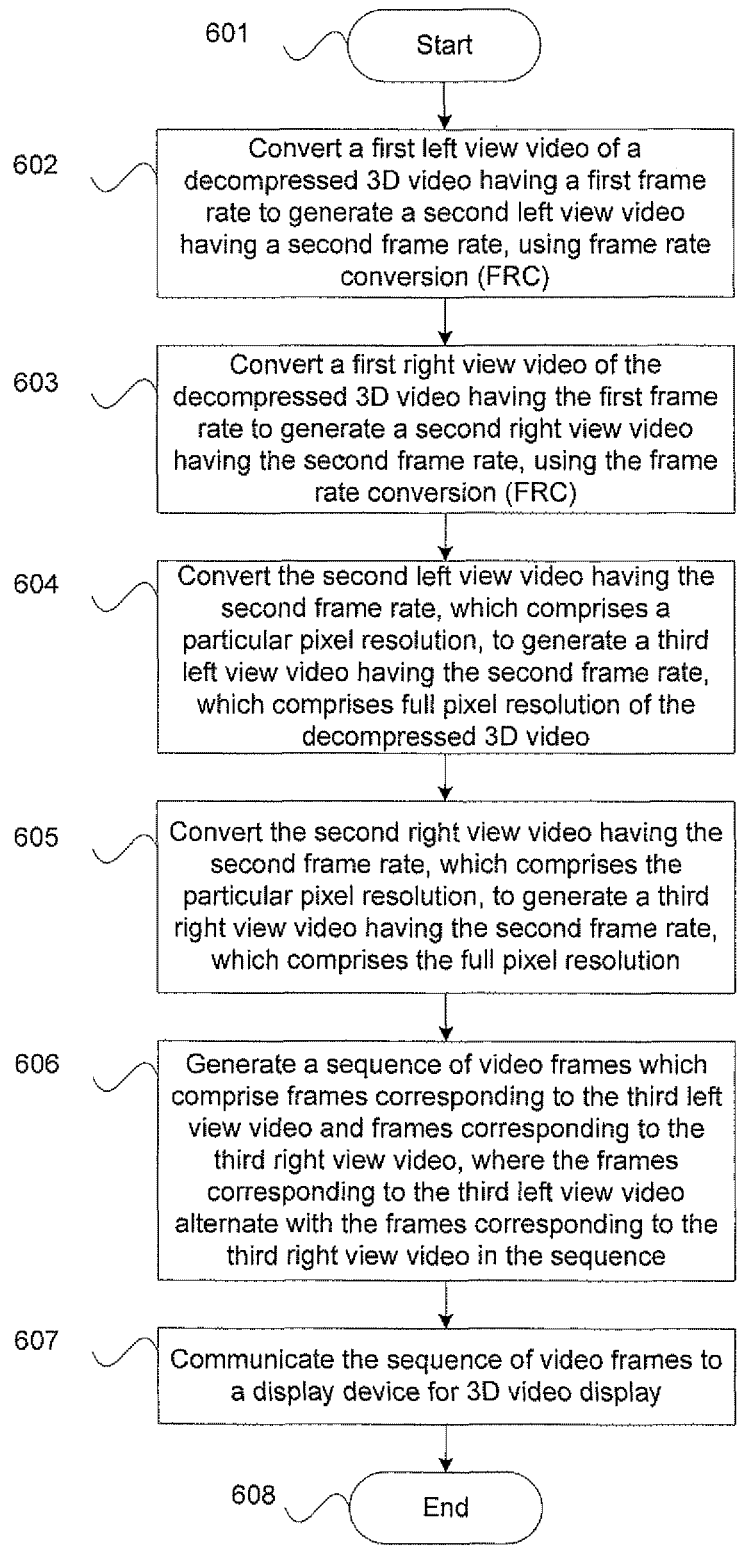
FIG. 6 is a flow chart illustrating exemplary steps for frame rate conversion of 3D frames, in accordance with an embodiment of the invention.

FIG. 6 is a flow chart illustrating exemplary steps for frame rate conversion of 3D frames, in accordance with an embodiment of the invention. Referring to FIG. 6, the exemplary steps start at step 601. In step 602, the FRC engine 120 in the 3D video rendering device 102 may be operable to convert a first left view video 201a of a decompressed 3D video 201 having a first frame rate to generate a second left view video 202a having a second frame rate, using frame rate conversion (FRC). In step 603, the FRC engine 120 may convert a first right view video 201b of the decompressed 3D video 201 having the first frame rate to generate a second right view video 202b having the second frame rate, using the frame rate conversion (FRC). In step 604, the video scaler 160 in the 3D video rendering device 102 may convert or scale the second left view video 202a having the second frame rate, which may comprise a particular pixel resolution such as half pixel resolution of the decompressed 3D video 201, to generate a third left view video 203a having the second frame rate, which may comprise full pixel resolution of the decompressed 3D video 201. In step 605, the video scaler 160 may convert or scale the second right view video 202b having the second frame rate, which may comprise the particular pixel resolution, to generate a third right view video 203b having the second frame rate, which may comprise the full pixel resolution. In step 606, the processor 130 of the 3D video rendering device 102 may generate a sequence of video frames which may comprise frames corresponding to the third left view video 203a and frames corresponding to the third right view video 203b. The frames corresponding to the third left view video 203a may alternate with frames corresponding to the third right view video 203b in the sequence, as illustrated by the video frames 204a-204j. In step 607, the 3D video rendering device 102 may communicate the sequence of video frames 204a-204j to a display device such as the display device 150 for 3D video display or presentation. The exemplary steps may proceed to the end step 608.

In various embodiments of the invention, a FRC engine 120, in a 3D video rendering device 102, may be operable to convert a first left view video of a decompressed 3D video having a first frame rate to generate a second left view video having a second frame rate, using frame rate conversion (FRC). The FRC engine 120 may convert a first right view video of the decompressed 3D video having the first frame rate to generate a second right view video having the second frame rate, using frame rate conversion (FRC). In this regard, the frame rate conversion (FRC) may comprise, for example, frame interpolation and/or frame repetition. The second left view video having the second frame rate, which may comprise a particular pixel resolution, may be converted by a video scaler 160 in the 3D video rendering device 102 to generate a third left view video having the second frame rate, which may comprise full pixel resolution of the decompressed 3D video. The second right view video having the second frame rate, which may comprise the particular pixel resolution, may be converted by the video scaler 160 in the 3D video rendering device 102 to generate a third right view video having the second frame rate, which may comprise the full pixel resolution. A processor 130 of the 3D video rendering device 102 may be operable to generate a sequence of video frames for 3D video display. The sequence of video frames may comprise frames corresponding to the third left view video and frames corresponding to the third right view video, and the frames corresponding to the third left view video may alternate with the frames corresponding to the third right view video.

In an exemplary embodiment of the invention, the first left view video 201a and the first right view video 201b of the decompressed 3D video 201 may be packed in a side-by side (half) format, where the first left view video 201a and the first right view video 201b may each comprise half pixel resolution of the decompressed 3D video 201. In such instances, the video scaler 160 in the 3D video rendering device 102 may scale the second left view video 202a having the second frame rate, which may comprise the half pixel resolution, to generate the third left view video 203a having the second frame rate, which may comprise the full pixel resolution. The video scaler 160 may scale the second right view video 202b having the second frame rate, which may comprise the half pixel resolution, to generate the third right view video 203b having the second frame rate, which may comprise the full pixel resolution.

In an exemplary embodiment of the invention, the decompressed 3D video 301 may comprise the first left view video 301a and the first right view video 301b which are packed in a top-and-bottom (half) format, and the first left view video 301a and the first right view video 301b may each comprise half pixel resolution of the decompressed 3D video 301. In such instances, the second left view video 302a having the second frame rate, which may comprise the half pixel resolution, may be scaled by video scaler 160 in the 3D video rendering device 102 to generate the third left view video 303a having the second frame rate, which may comprise the full pixel resolution. The second right view video 302b having the second frame rate, which may comprise the half pixel resolution, may be scaled by the video scaler 160 to generate the third right view video 303*b* having the second frame rate, which may comprise the full pixel resolution.

In an exemplary embodiment of the invention, the first left view video 401*a* and the first right view video 401*b* of the decompressed 3D video 401 may be packed in a frame packing format, such that the first left view video 401*a* and the first right view video 401*b* may each comprise the full pixel resolution of the decompressed 3D video 401. In such instances, the second left view video 402*a* having the second frame rate and the second right view video 402*b* having the second frame rate may each comprise the full pixel resolution.

In an exemplary embodiment of the invention, the decompressed 3D video 501 may comprise the first left view video 501*a* and the first right view video 501*b* in a stereoscopic format, and the first left view video 501*a* and the first right view video 501*b* may each comprise the full pixel resolution of the decompressed 3D video 501. In such instances, the second left view video 502*a* having the second frame rate and the second right view video 502*b* having the second frame rate may each comprise the full pixel resolution.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for frame rate conversion of 3D frames.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
in a three-dimensional (3D) video rendering device:
converting a first left view video of a decompressed 3D video having a first frame rate to generate a second left view video having a second frame rate, using frame rate conversion (FRC);
converting a first right view video of said decompressed 3D video having said first frame rate to generate a second right view video having said second frame rate, using said FRC;
converting said second left view video having said second frame rate, which comprises a particular pixel resolution, to generate a third left view video having said second frame rate, which comprises full pixel resolution of said decompressed 3D video;
converting said second right view video having said second frame rate, which comprises said particular pixel resolution, to generate a third right view video having said second frame rate, which comprises said full pixel resolution; and
generating a sequence of video frames for 3D video display, wherein said sequence of video frames comprises frames corresponding to said third left view video and frames corresponding to said third right view video, and said frames corresponding to said third left view video alternate with said frames corresponding to said third right view video.

2. The method according to claim 1, wherein said FRC comprises frame interpolation or frame repetition.

3. The method according to claim 1, wherein said decompressed 3D video comprises said first left view video and said first right view video packed in a side-by side (half) format, and said first left view video and said first right view video each comprises half pixel resolution of said decompressed 3D video.

4. The method according to claim 3, comprising:
scaling said second left view video having said second frame rate, which comprises said half pixel resolution, to generate said third left view video having said second frame rate, which comprises said full pixel resolution; and
scaling said second right view video having said second frame rate, which comprises said half pixel resolution, to generate said third right view video having said second frame rate, which comprises said full pixel resolution.

5. The method according to claim 1, wherein said decompressed 3D video comprises said first left view video and said first right view video packed in a top-and-bottom (half) format, and said first left view video and said first right view video each comprises half pixel resolution of said decompressed 3D video.

6. The method according to claim 5, comprising:
scaling said second left view video having said second frame rate, which comprises said half pixel resolution, to generate said third left view video having said second frame rate, which comprises said full pixel resolution; and
scaling said second right view video having said second frame rate, which comprises said half pixel resolution, to generate said third right view video having said second frame rate, which comprises said full pixel resolution.

7. The method according to claim 1, wherein said decompressed 3D video comprises said first left view video and said first right view video packed in a frame packing format, and said first left view video and said first right view video each comprises said full pixel resolution.

8. The method according to claim 7, wherein said second left view video and said second right view video each comprises said full pixel resolution.

9. The method according to claim 1, wherein said decompressed 3D video comprises said first left view video and said first right view video in a stereoscopic format, and said first left view video and said first right view video each comprises said full pixel resolution.

10. The method according to claim 9, wherein said second left view video and said second right view video each comprises said full pixel resolution.

11. A system for processing video, the system comprising:
one or more processors, one or more circuits, or any combination thereof for use in a three-dimensional (3D) video rendering device, said one or more processors, one or more circuits, or any combination thereof being operable to:
convert a first left view video of a decompressed 3D video having a first frame rate to generate a second left view video having a second frame rate, using frame rate conversion (FRC);
convert a first right view video of said decompressed 3D video having said first frame rate to generate a second right view video having said second frame rate, using said (FRC);
convert said second left view video having said second frame rate, which comprises a particular pixel resolution, to generate a third left view video having said second frame rate, which comprises full pixel resolution of said, decompressed 3D video;
convert said second right view video having said second frame rate, which comprises said particular pixel resolution, to generate a third right view video having said second frame rate, which comprises said full pixel resolution; and
generate a sequence of video frames for 3D video display, wherein said sequence of video frames comprises frames corresponding to said third left view video and frames corresponding to said third right view video, and said frames corresponding to said third left view video alternate with said frames corresponding to said third right view video.

12. The system according to claim 11, wherein said FRC comprises frame interpolation or frame repetition.

13. The system according to claim 11, wherein said decompressed 3D video comprises said first left view video and said first right view video packed in a side-by-side (half) format, and said first left view video and said first right view video each comprises half pixel resolution of said decompressed 3D video.

14. The system according to claim 13, wherein said one or more processors, one or more circuits, or any combination thereof are operable to:
scale said second left view video having said second frame rate, which comprises said half pixel resolution, to generate said third left view video having said second frame rate, which comprises said full pixel resolution; and
scale said second right view video having said second frame rate, which comprises said half pixel resolution, to generate said third right view video having said second frame rate, which comprises said full pixel resolution.

15. The system according to claim 11, wherein said decompressed 3D video comprises said first left view video and said first right view video packed in a top-and-bottom (half) format, and said first left view video and said first right view video each comprises half pixel resolution of said decompressed 3D video.

16. The system according to claim 15, wherein said one or more processors, one or more circuits, or any combination thereof are operable to:
scale said second left view video having said second frame rate, which comprises said half pixel resolution, to generate said third left view video having said second frame rate, which comprises said full pixel resolution; and
scale said second right view video having said second frame rate, which comprises said half pixel resolution, to generate said third right view video having said second frame rate, which comprises said full pixel resolution.

17. The system according to claim 11, wherein said decompressed 3D video comprises said first left view video and said first right view video packed in a frame packing format, and said first left view video and said first right view video each comprises said full pixel resolution.

18. The system according to claim 17, wherein said second left view video and said second right view video each comprises said full pixel resolution.

19. The system according to claim 11, wherein said decompressed 3D video comprises said first left view video and said first right view video in a stereoscopic format, and said first left view video and said first right view video each comprises said full pixel resolution.

20. The system according to claim 19, wherein said second left view video and said second right view video each comprises said full pixel resolution.

* * * * *